Patented Dec. 8, 1931

1,835,997

UNITED STATES PATENT OFFICE

WILLIAM E. CROOKS AND CHARLES D. WALTON, OF CUMBERLAND, MARYLAND, ASSIGNORS TO CELANESE CORPORATION OF AMERICA, A CORPORATION OF DELAWARE

TREATMENT OF SOLIDS WITH NORMALLY LIQUID SUBSTANCES

No Drawing. Application filed December 29, 1927. Serial No. 243,468.

This invention relates to the art of preparing homogeneous solutions of solids with liquids or homogeneous plastic mixtures of such solids and liquids and relates more particularly to the preliminary treatment of the solids whereby such homogeneous solutions or plastic masses may be readily and quickly prepared.

An object of our invention is to provide a method of pretreating a solid that is to be dissolved or mixed with a solvent therefor, so that a homogeneous solution or mixture may be readily made subsequent to such pretreatment.

A further object of our invention is to pretreat a solid with vapors of a solvent for the solid, which solvent is absorbed by said solid. Other objects of our invention will appear from the following detailed description.

The problem of making viscous solutions, jellies or plastic masses containing solid material and solvents for the solid material arises in many arts, and often presents serious manipulative difficulties. Very often, when dry solid is mixed with a liquid, lumps of the solid are formed which lumps are surrounded by the resulting solution. To break up these lumps it is often necessary to use elaborate stirrers and submit the solution to agitation for a prolonged period of time, since these lumps strongly resist disintegration. Frequently even after these lumps have disappeared, a truly homogeneous solution or plastic mass is not formed, since the concentration of the solution locally formed by these lumps is higher than that of the remaining solution. Because of the viscous nature of the solution, further agitation does not cause the uniform diffusion of these more concentrated parts in the remainder of the solution, so that a heterogeneous solution is formed. Products formed from such solutions are of inferior quality in many instances.

In accordance with our invention, we pretreat the solid to be dissolved in such a manner that a homogeneous solution may be quickly and readily formed, thus overcoming the above difficulties with consequent economy of time and apparatus for the preparation of homogeneous solutions, and the consequent improvement in the products made from such solutions.

We have found that in many cases where a solid has an affinity for the liquid in which it is to be dissolved, a pretreatment of the solid with this liquid in attenuated form, causes the solid to assume such physical characteristics that it will readily dissolve in the liquid to form homogeneous solutions. The affinity of the solid for the liquid may be displayed by the ability of the solid to absorb or adsorb the vapors of the liquid from a gaseous mixture containing the same, or else the power to absorb the liquid from a solution of this liquid in another liquid that has no affinity for the solid.

In accordance with our invention, we pretreat the solid that is to be dissolved in or rendered plastic by a solvent with a liquid in attenuated form, which liquid has the property of rendering the solid capable of readily dissolving in a solvent. This liquid is preferably the same as the solvent to be used, but it may be some other liquid. This preliminary treatment is preferably done by exposing the solid to the vapor of the liquid. Such treating vapors may be admixed with other gaseous material such as air or it may be in the pure state. Alternately the liquid may be applied as a solution in an inert other liquid. When the liquid is applied in the form of vapor in admixture with gases, air or other oxygen containing gases may be used in those cases where free oxygen has no deleterious effect on the solid or the liquid. If the vapor forms explosive mixtures with air, care should be taken that the vapor-air mixture be outside the range of explosive mixtures. Often it is desirable to replace the air by an inert gas such as nitrogen, carbon dioxide, hydrogen, etc.

This invention is of general application and may be applied to the preparation of solutions or plastic masses containing cellulose derivatives, rubber, resins, etc. Thus in making viscose, the soda cellulose may be preliminarily exposed to the vapor of carbon bisulphide. This invention relates more particularly to the treatment of such derivatives of cellulose as cellulose esters or cellulose ethers. Examples of cellulose esters are cellulose nitrate and such organic esters of cellulose as cellulose acetate, cellulose formate, cellulose propionate and cellulose butyrate. Examples of cellulose ethers are methyl cellulose, ethyl cellulose and benzyl cellulose. Solvents for these cellulose derivatives are acetone, alcohol, ether, ethylene dichloride, etc. and these may be used as the pretreating agents. Moreover, swelling agents may also be used for this purpose, and even other materials that will have the desired action. As stated before, the treating material may be applied in liquid form in an inert liquid diluent, for instance the active liquid acetone may be dissolved in an inert liquid such as benzene when this is applied to cellulose acetate, care being taken that the inert liquid be present in sufficiently high proportion so that it remains inert.

In order to further explain our invention the following detailed description of the same will be given as applied to making cellulose acetate yarn, it being understood, however that the same is not limited thereto.

Air dried cellulose acetate that is soluble in acetone is placed in a chamber. There, it is exposed at a temperature of 21 C. to a current of air which is saturated with acetone at that temperature. After the cellulose acetate has absorbed the acetone to the extent of 20 to 25% of its weight, the flow of the acetone vapor laden air is interrupted. The resulting product, although it contains from 17 to 20% of acetone, still retains the original appearance of the cellulose acetate, but feels damp to the touch. This material is then mixed with sufficient liquid acetone to make a solution of any desired concentration, say a solution containing 25% of cellulose acetate. The cellulose acetate dissolves in the acetone much more rapidly than does ordinary dry cellulose acetate and forms solutions of much greater homogeneity than can be formed by the use of ordinary dry cellulose acetate. The cellulose acetate solution is then spun, preferably in a dry spinning machine, to form cellulose acetate yarn. During the absorption of the acetone vapor by the cellulose acetate, there is some evolution of heat, and if it is desired to maintain a constant temperature, provision should be made for removal of this heat.

If highly concentrated solutions or pates, gels or other plastic masses of cellulose acetate are desired, these may be made directly by exposing the cellulose acetate to pure acetone vapor instead of air saturated with acetone vapor or by exposure under conditions in which the solvent vapor is alternatively heated and cooled, compressed and reduced at a temperature causing a phenomenon which may be described as intermittent condensation in the mass of the material undergoing "solution".

It is to be understood that the foregoing detailed description is given merely by way of illustration and that many variations may be made therein without departing from the spirit of our invention.

Having described our invention what we claim and desire to secure by Letters Patent is:

1. The process of preparing solutions or plastic masses containing derivatives of cellulose comprising pretreating said derivative of cellulose with a solvent for the same in vaporous form, and then mixing said pretreated derivative of cellulose with a solvent in liquid form.

2. The process of preparing solutions or plastic masses containing cellulose acetate comprising pretreating said cellulose acetate with a solvent for the same in vaporous form, and then mixing said pretreated cellulose acetate with a solvent in liquid form.

3. The process of preparing solutions or plastic masses containing derivatives of cellulose comprising pretreating said derivatives of cellulose with a solvent for the same in vaporous form in admixture with a gas and then mixing said pretreated derivatives of cellulose with a solvent in liquid form.

4. The process of preparing solutions or plastic masses containing cellulose acetate comprising pretreating said cellulose acetate with a solvent for the same in vaporous form in admixture with a gas and then mixing said pretreated cellulose acetate with a solvent in liquid form.

5. The process of preparing solutions or plastic masses containing cellulose acetate comprising pretreating said cellulose acetate with acetone in vaporous form and then mixing said pretreated cellulose acetate with acetone in liquid form.

6. The method of forming a solution of cellulose acetate comprising treating at ordinary temperatures cellulose acetate in solid form with air saturated with acetone vapor until the cellulose acetate has absorbed from 20 to 25% of its weight of acetone and then dissolving the cellulose acetate so treated in liquid acetone whereby a homogeneous solution is readily formed.

In testimony whereof, we have hereunto subscribed our names.

WILLIAM E. CROOKS.
CHARLES D. WALTON.